US012570306B2

(12) United States Patent
   Ishiyama

(10) Patent No.: US 12,570,306 B2
(45) Date of Patent: Mar. 10, 2026

(54) MAXIMUM SPEED INFORMING DEVICE

(71) Applicant: TOYOTA JIDOSHA KABUSHIKI KAISHA, Toyota (JP)

(72) Inventor: Yuichi Ishiyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/829,730

(22) Filed: Sep. 10, 2024

(65) Prior Publication Data

US 2025/0115265 A1     Apr. 10, 2025

(30) Foreign Application Priority Data

Oct. 5, 2023     (JP) ................................. 2023-173866

(51) Int. Cl.
   B60W 50/14     (2020.01)
   G06V 20/56     (2022.01)
   H04W 4/029     (2018.01)
   B60W 50/00     (2006.01)

(52) U.S. Cl.
   CPC ........... B60W 50/14 (2013.01); G06V 20/588 (2022.01); H04W 4/029 (2018.02); B60W 2050/0027 (2013.01); B60W 2555/20 (2020.02)

(58) Field of Classification Search
   CPC ......... B60W 50/14; B60W 2050/0027; B60W 2555/20; B60W 2050/146; B60W 2720/10; B60W 2555/60; B60W 2556/50; G06V 20/588; G06V 20/582; H04W 4/029
   USPC ....................................................... 701/70
   See application file for complete search history.

(56) References Cited

U.S. PATENT DOCUMENTS

| | | | |
|---|---|---|---|
| 9,835,468 | B2 | 12/2017 | Yoshitomi et al. |
| 10,017,178 | B2 | 7/2018 | Morimoto et al. |
| 10,132,642 | B2 | 11/2018 | Yoshitomi et al. |
| 10,679,077 | B2 | 6/2020 | Kinoshita et al. |
| 11,010,624 | B2 | 5/2021 | Hayashi et al. |
| 11,017,247 | B2 | 5/2021 | Hayashi et al. |
| 11,117,595 | B2 | 9/2021 | Sasaki et al. |
| 2016/0042239 | A1* | 2/2016 | Fowe ........................ G06T 7/20 |
| | | | 382/104 |
| 2017/0349097 | A1 | 12/2017 | Nishimura |
| 2021/0247526 | A1 | 8/2021 | Kijima |
| 2024/0092381 | A1* | 3/2024 | Kawano ............... G06V 20/582 |

FOREIGN PATENT DOCUMENTS

| | | | |
|---|---|---|---|
| JP | 2017-215902 | A | 12/2017 |
| JP | 2020-025174 | A | 2/2020 |

* cited by examiner

*Primary Examiner* — Yi-Kai Wang
(74) *Attorney, Agent, or Firm* — SoraIP, Inc.

(57) ABSTRACT

The maximum speed informing device includes a camera device that acquires image data by capturing a scene in front of the vehicle, a display unit configured to be able to display the maximum speed, and a controller configured to be able to change the maximum speed displayed on the display unit, the controller acquires a numerical value included in the captured scene as a maximum speed candidate based on the image data, acquires road structure information indicating a structure of a road including a lane on which the vehicle is traveling based on the image data, estimates a range of a maximum speed of the road based on the acquired road structure information, and displays the maximum speed candidate within the estimated maximum speed range as the maximum speed on the display unit.

5 Claims, 5 Drawing Sheets

FIG. 5

| RADIUS OF CURVATURE R | LANE WIDTH W | NUMBER OF LANES N | SHOULDER WIDTH S | MAX. VLmaxA | MIN. VLminA |
|---|---|---|---|---|---|
| R ≤ R1 | W ≤ W1 | N = 1 | S < S1 | a1 | b1 |
| | | | S ≥ S1 | a2 | b2 |
| | | N ≥ 2 | S < S1 | a3 | b3 |
| | | | S ≥ S1 | a4 | b4 |
| | W1 < W ≤ W2 | N = 1 | S < S1 | a5 | b5 |
| | | | S ≥ S1 | a6 | b6 |
| | | N ≥ 2 | S < S1 | a7 | b7 |
| | | | S ≥ S1 | a8 | b8 |
| | W2 < W | N = 1 | S < S1 | a9 | b9 |
| | | | S ≥ S1 | a10 | b10 |
| | | N ≥ 2 | S < S1 | a11 | b11 |
| | | | S ≥ S1 | a12 | b12 |
| R1 < R ≤ R2 | W ≤ W1 | N = 1 | S < S1 | a13 | b13 |
| | | | S ≥ S1 | a14 | b14 |
| | | N ≥ 2 | S < S1 | a15 | b15 |
| | | | S ≥ S1 | a16 | b16 |
| | W1 < W ≤ W2 | N = 1 | S < S1 | a17 | b17 |
| | | | S ≥ S1 | a18 | b18 |
| | | N ≥ 2 | S < S1 | a19 | b19 |
| | | | S ≥ S1 | a20 | b20 |
| | W2 < W | N = 1 | S < S1 | a21 | b21 |
| | | | S ≥ S1 | a22 | b22 |
| | | N ≥ 2 | S < S1 | a23 | b23 |
| | | | S ≥ S1 | a24 | b24 |
| R2 < R | W ≤ W1 | N = 1 | S < S1 | a25 | b25 |
| | | | S ≥ S1 | a26 | b26 |
| | | N ≥ 2 | S < S1 | a27 | b27 |
| | | | S ≥ S1 | a28 | b28 |
| | W1 < W ≤ W2 | N = 1 | S < S1 | a29 | b29 |
| | | | S ≥ S1 | a30 | b30 |
| | | N ≥ 2 | S < S1 | a31 | b31 |
| | | | S ≥ S1 | a32 | b32 |
| | W2 < W | N = 1 | S < S1 | a33 | b33 |
| | | | S ≥ S1 | a34 | b34 |
| | | N ≥ 2 | S < S1 | a35 | b35 |
| | | | S ≥ S1 | a36 | b36 |

| VISIBILITY L (m) | PRESENCE OR ABSENCE OF ROAD SURFACE FREEZING | RAINFALL AND SNOW LEVEL | PRESENCE OR ABSENCE OF STRONG WIND | MAX. VLmaxB | MIN. VLminB |
|---|---|---|---|---|---|
| $L \leq L1$ | YES | STRONG | YES | c1 | d1 |
|  |  |  | NONE | c2 | d2 |
|  |  | NORMAL | YES | c3 | d3 |
|  |  |  | NONE | c4 | d4 |
|  |  | WEAK OR NONE | YES | c5 | d5 |
|  |  |  | NONE | c6 | d6 |
|  | NONE | STRONG | YES | c7 | d7 |
|  |  |  | NONE | c8 | d8 |
|  |  | NORMAL | YES | c9 | d9 |
|  |  |  | NONE | c10 | d10 |
|  |  | WEAK OR NONE | YES | c11 | d11 |
|  |  |  | NONE | c12 | d12 |
| $L > L1$ | YES | STRONG | YES | c13 | d13 |
|  |  |  | NONE | c14 | d14 |
|  |  | NORMAL | YES | c15 | d15 |
|  |  |  | NONE | c16 | d16 |
|  |  | WEAK OR NONE | YES | c17 | d17 |
|  |  |  | NONE | c18 | d18 |
|  | NONE | STRONG | YES | c19 | d19 |
|  |  |  | NONE | c20 | d20 |
|  |  | NORMAL | YES | c21 | d21 |
|  |  |  | NONE | c22 | d22 |
|  |  | WEAK OR NONE | YES | c23 | d23 |
|  |  |  | NONE | c24 | d24 |

MAXIMUM SPEED INFORMING DEVICE

CROSS-REFERENCE TO RELATED APPLICATION

This application claims priority to Japanese Patent Application No. 2023-173866 filed on Oct. 5, 2023, incorporated herein by reference in its entirety.

BACKGROUND

1. Technical Field

The present disclosure relates to a maximum speed informing device that informs a driver of a maximum speed (a so-called speed limit) set for a road on which a vehicle is traveling.

2. Description of Related Art

When image data captured by a camera device include a road sign that indicates a maximum speed, a conventional device displays the maximum speed specified by the road sign on a display unit. When the image data captured by the camera device do not include a road sign that indicates a maximum speed, the conventional device displays, on the display unit, a maximum speed included in map information corresponding to the present position of the vehicle specified according to a global positioning system (GPS) signal. When the map information does not include a maximum speed, further, the conventional device estimates a maximum speed based on road attribute information included in the map information, and displays the estimated maximum speed on the display unit (see Japanese Unexamined Patent Application Publication No. 2017-215902 (JP 2017-215902 A)).

SUMMARY

The maximum speed acquired based on the image data captured by the camera device is not necessarily correct. This is because the camera device erroneously recognizes an "object that has a pattern similar to the road sign that indicates the maximum speed (e.g. a pattern on a side surface of a vending machine, a signboard that has a pattern similar to the road sign, etc.)" as the road sign that indicates the maximum speed. This is because the camera device erroneously recognizes a road sign applied to a different adjacent road as a road sign to be applied to the road on which the vehicle is traveling. This is because the correct maximum speed is recognized as a different speed since the limit of the recognition performance of the camera device is exceeded. Further, there may be a case where a road different from the road on which the vehicle is actually traveling is recognized as the road on which the vehicle is presently traveling, since an error is also included in the present position of the vehicle specified according to the global positioning system (GPS) signal. In this case, the "maximum speed of the different road" included in the map information may be displayed, or an erroneous maximum speed estimated based on the road attribute information for the different road may be displayed.

The present disclosure has been made to address such an issue. That is, an object of the present disclosure is to provide a maximum speed informing device capable of reducing a possibility that an erroneous maximum speed is indicated.

One aspect of the present disclosure provides a maximum speed informing device including: a camera device (20) that acquires image data (captured forward scene data) by capturing a scene ahead of a vehicle; an informing unit (display unit 61, speaker 62) configured to be able to provide information to a driver of the vehicle; and a controller (10, 22, 60) configured to be able to change the information provided from the informing unit.

In the maximum speed informing device, the controller is configured to: acquire numerical values included in the captured scene as maximum speed candidates based on the image data (S205); acquire road structure information that indicates a structure of a road on which the vehicle is traveling based on the image data (S210); estimate a maximum speed range (maximum value VLmax and minimum value VLmin) as a possible range of a maximum speed set for the road based on the acquired road structure information (S215, S225, S240); and cause the informing unit to indicate a candidate within the estimated maximum speed range, among the maximum speed candidates, as the maximum speed set for the road (S245 to S255).

According to this aspect, information (road structure information) that indicates the structure of the road on which the vehicle is traveling is acquired based on the image data. Since a lane in which the vehicle is traveling is accurately specified according to the image data, the road structure information may also be accurately acquired as information that indicates the structure of the road including the lane in which the vehicle is traveling. Thus, the maximum speed range is accurately estimated based on the road structure information, and thus there is a high possibility that the maximum speed candidates within the maximum speed range match the correct maximum speed. As a result, this aspect can reduce the possibility that an erroneous maximum speed is indicated.

In the above description, in order to facilitate understanding of the present disclosure, names and/or symbols used in the embodiment to be discussed later are provided in parentheses for components of the disclosure corresponding to the embodiment. However, the constituent elements of the present disclosure are not limited to those according to the embodiment prescribed by such names and/or symbols. The present disclosure also covers a maximum speed informing method and a maximum speed informing program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a look-up table stored in the driving support ECU shown in FIG. 1; and FIG. 6 is a look-up table stored in the driving support ECU shown in FIG. 1.

DETAILED DESCRIPTION OF EMBODIMENTS

Figure 1:
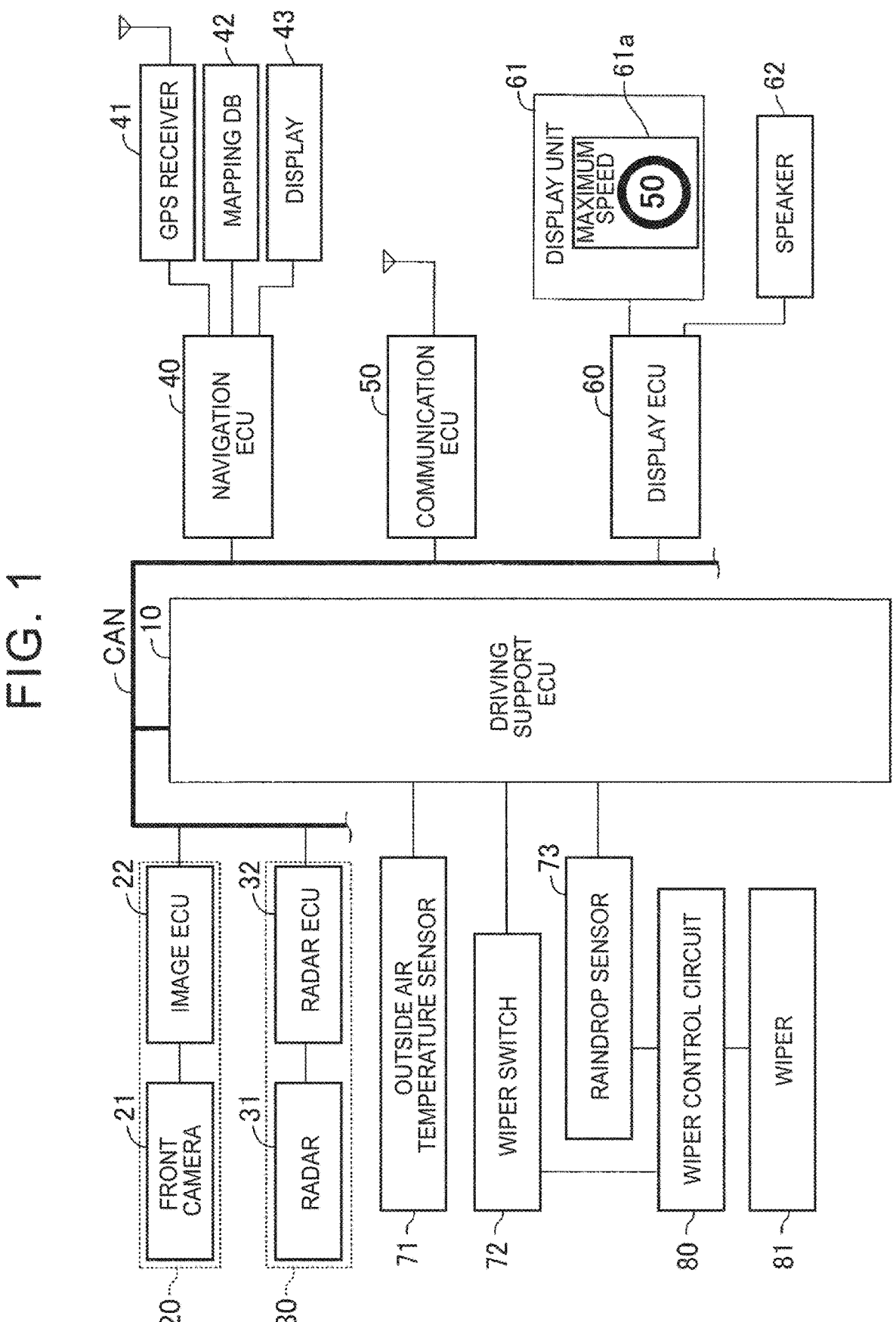
FIG. 1 is a schematic configuration diagram of a maximum speed informing device according to an embodiment of the present disclosure.

A maximum speed informing device (hereinafter, simply referred to as "the present notification device" or "the present display device") according to an embodiment of the present disclosure includes components described later with reference to FIG. 1, and is applied to a vehicle (hereinafter, also referred to as "the own vehicle").

In the present specification, "ECU" is an Electronic Control Unit (ECU) including a microcomputer as a main part, and is also referred to as a controller. The plurality of ECU illustrated in FIG. 1 are connected to each other through a Controller Area Network (CAN) so as to be able to exchange information. Some or all of ECU shown in FIG. 1 may be integrated into one ECU. Microcomputer includes a Central Processing Unit (CPU), Random Access Memory (RAM), Read Only Memory (ROM), ROM and other non-volatile memories (storage media), interfaces, and the like, and executes instructions (programs and routines) stored in a ROM to realize various functions described below.

As will be described later, the driving support ECU10 realizes a function (load sign assist (RSA) function) of displaying the maximum speed (so-called speed limit) displayed by the road sign to the driver.

The camera device 20 includes a front camera 21 and an image ECU22. The front camera 21 captures an image of a "scene in front of the own vehicle" every time a predetermined time elapses, and acquires image data (front scene captured data or front image data). The image ECU22 transmits the image data from the front camera 21 to the driving support ECU10 every time a predetermined period elapses.

The radar device 30 is a well-known device that acquires information about a target object existing in front of the host vehicle by using a millimeter-wave band radio wave, and includes a radar 31 and a radar ECU32. The radar 31 transmits the transmitted radio waves and the received reflected waves to the radar ECU32. The radar ECU32 acquires radar target information based on the information from the radar 31, and transmits the radar target information to the driving support ECU10 every time a predetermined period of time elapses. The radar target information includes a distance to the target, an orientation of the target, a relative velocity of the target, and the like.

The navigation ECU40 is connected to a GPS receiver 41, a map database 42, and a display touch panel 43 for displaying touch buttons. The navigation ECU40 estimates the present position of the host vehicle based on GPS received by GPS receiver 41. The navigation ECU40 acquires information of the road to which the current position of the host vehicle belongs from the estimated current position of the host vehicle and the map data (map information) stored in the map database 42. The information on the road includes information on the maximum speed set for the road including the lane (hereinafter, also referred to as the "own lane") on which the own vehicle is currently traveling.

The communication ECU50 communicates with a device outside the host vehicle (for example, a roadside device, an information center that provides information including weather information, and the like), and acquires various kinds of information from the external device.

The display ECU60 is connected to the display unit 61 and the speaker 62 arranged at a position visible from the driver's seat, and controls the information displayed on the display unit 61 and the sound generated from the speaker 62. The display unit 61 is provided with an area 61a for displaying the maximum speed. The display ECU60 notifies the driver of the maximum speed by displaying the maximum speed included in the instruction from the driving support ECU10 on the area 61a. Further, the display ECU60 notifies the driver of the maximum speed by causing the speaker 62 to pronounce the maximum speed included in the instruction from the driving support ECU10. The display ECU60 is also referred to as a notification ECU60.

The driving support ECU10 is further connected to the "sensors and switches" described below, and receives the values (signals) detected or outputted from them.

Outdoor air temperature sensor 71 for detecting the outside air temperature.

A wiper switch 72 operated by a driver to control the wiper 81 of the host vehicle.

A raindrop sensor 73 for detecting raindrops adhering to the windshield (see, for example, Japanese Unexamined Patent Application Publication No. 2020-25174 (JP 2020-25174 A)). The wiper switch 72 and the raindrop sensor 73 are connected to the wiper control circuit 80. The wiper control circuit 80 drives the wiper 81 of the host vehicle based on signals from the wiper switch 72 and the raindrop sensor 73.

Overview of Operation

The notification device extracts, based on the image data acquired by the camera device 20, a symbol similar to the road sign indicating the maximum speed included in the image data, and acquires the numerical value indicated in the extracted symbol as a candidate of the maximum speed (first candidate). Further, the notification device acquires, via the navigation ECU40, the maximum speed candidates (second candidates) set for the road including the own lane from the map data of the map database 42 and the present position of the own vehicle estimated based on GPS signal. Then, the notification device acquires the final candidate of the maximum speed from the first candidate and the second candidate in accordance with a predetermined rule.

Based on the image data acquired by the camera device 20, the notification device acquires information indicating the structure of the road including the own lane (hereinafter, also referred to as "road structure information") as "information indicating the current traveling environment of the vehicle". The road structure information includes, for example, a curve radius of the own lane, a lane width of the own lane, a total number of lanes in the same direction as the vehicle traveling direction in the own lane, a road shoulder width of a road including the own lane, and the like. Each country has established, by law, an allowable range of maximum speed or maximum speed for a road having a predetermined road structure. Therefore, the notification device estimates the range of the maximum speed (that is, the maximum value of the maximum speed and the minimum value of the maximum speed) by applying the acquired road structure information to the "look-up table predetermined according to the laws and regulations of each country".

Furthermore, in some countries, legislation has been established to regulate the maximum speed of a road having a predetermined road structure to a low speed according to weather conditions. Therefore, the notification device acquires the weather information of the area around the own vehicle as "information indicating the traveling environment at the current time of the vehicle", and corrects the maximum value and the minimum value of the maximum speed based on the weather information, thereby acquiring the maximum value and the minimum value of the final maximum speed. notification device displays a candidate that is equal to or higher than the minimum value of the maximum speed and equal to or lower than the maximum value of the maximum speed (that is, a candidate of the maximum speed that is within the range of the maximum speed) as the maximum speed (the final maximum speed, the determined maximum speed) on the display unit 61 among the above-described final candidates of the maximum speed (notification to the driver).

Specific Operation

CPU of the driving support ECU10 (hereinafter, simply referred to as "CPU") executes the routine shown in FIG. 2 every time a predetermined period elapses. In the following description, "step" is referred to as "S".

Figure 2:
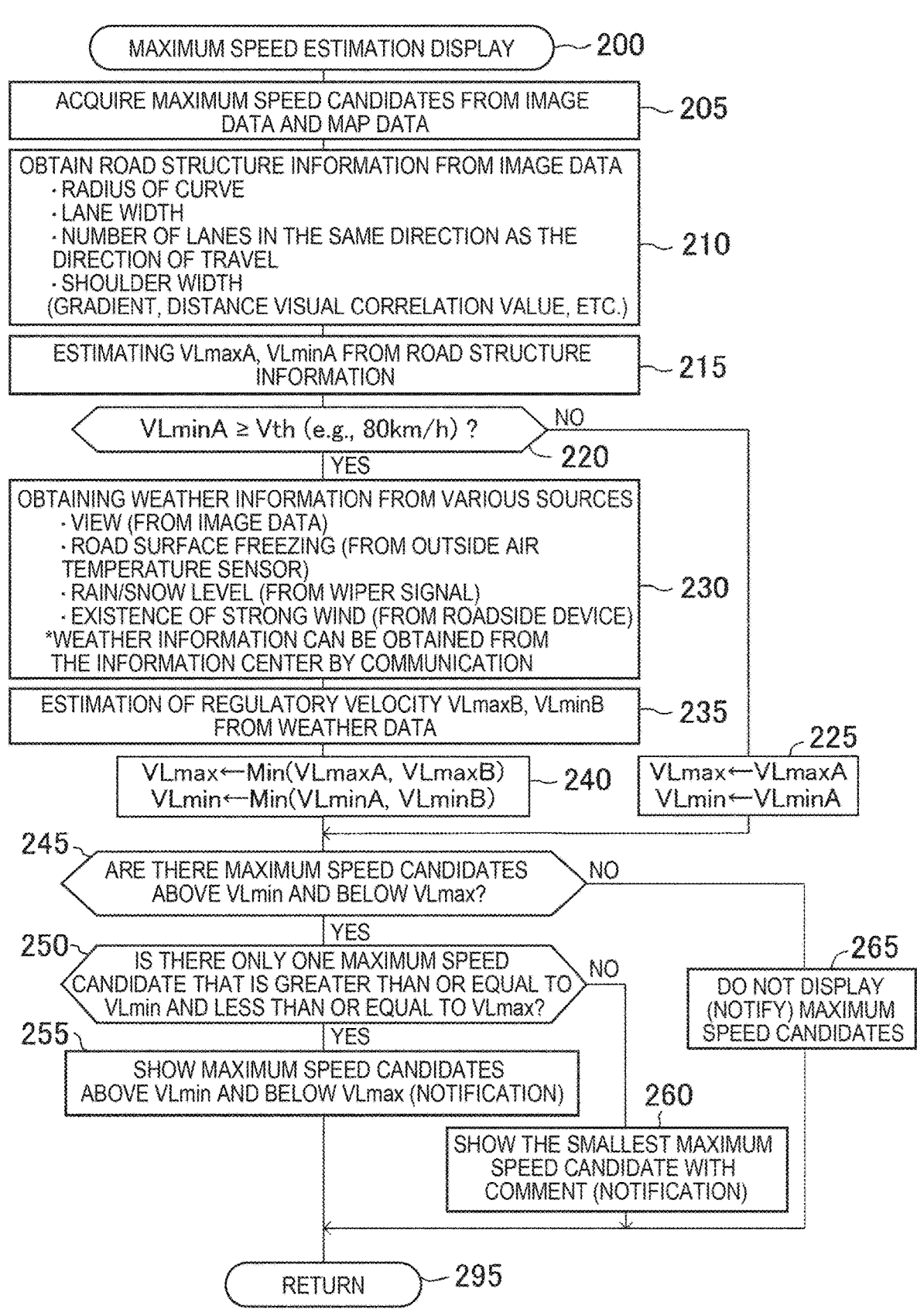
FIG. 2 is a routine executed by CPU of the driving support ECU shown in FIG. 1.

At a predetermined timing, CPU starts the process from S200 of FIG. 2 and proceeds to S205 to analyze the image data transmitted from the camera device 20, thereby recognizing a symbol similar to the road sign representing the maximum speed included in the image data. For example, CPU performs pattern matching between the "pattern of the road sign representing the maximum speed" and the "pattern included in the image generated by the image data" stored in advance in ROM. CPU extracts a symbol similar to the road sign representing the maximum speed from the image data. Further, CPU recognizes the numerical value included in the extracted symbol by pattern matching, and acquires the numerical value as a candidate of the maximum speed (first candidate).

Figure 3:
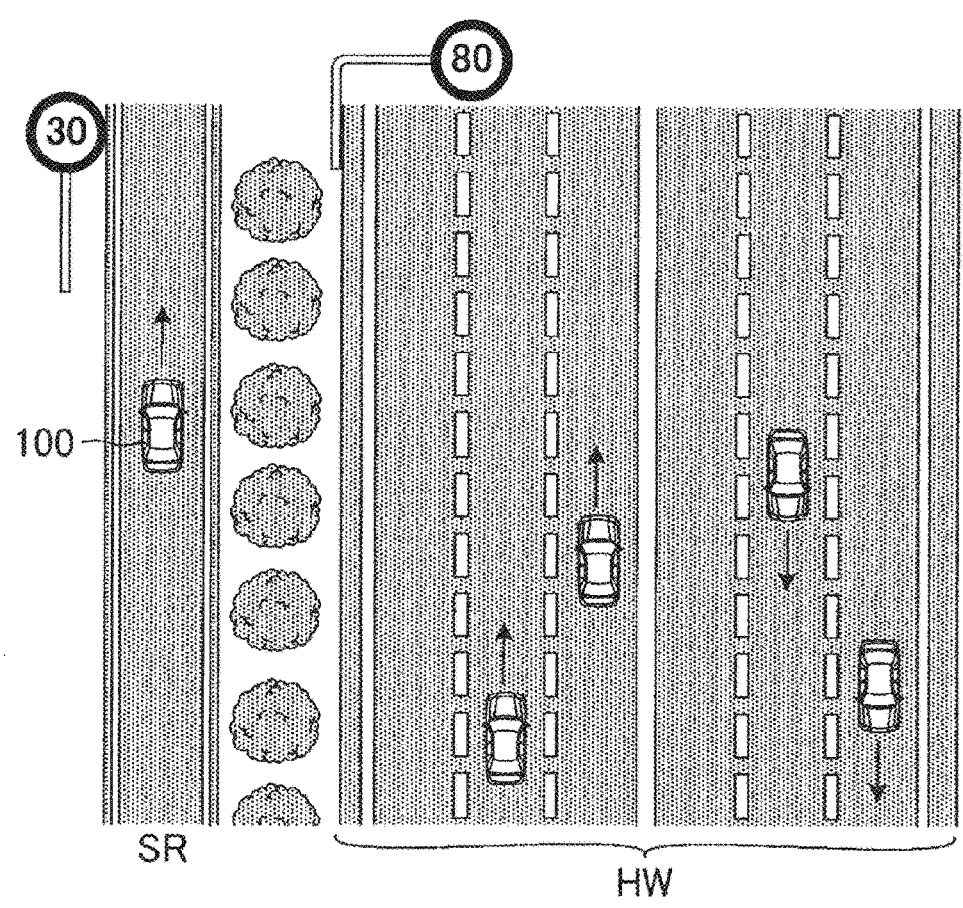
FIG. 3 is an overhead view of a particular scene for describing the operation of the driving support ECU shown in FIG. 1.
Figure 4:
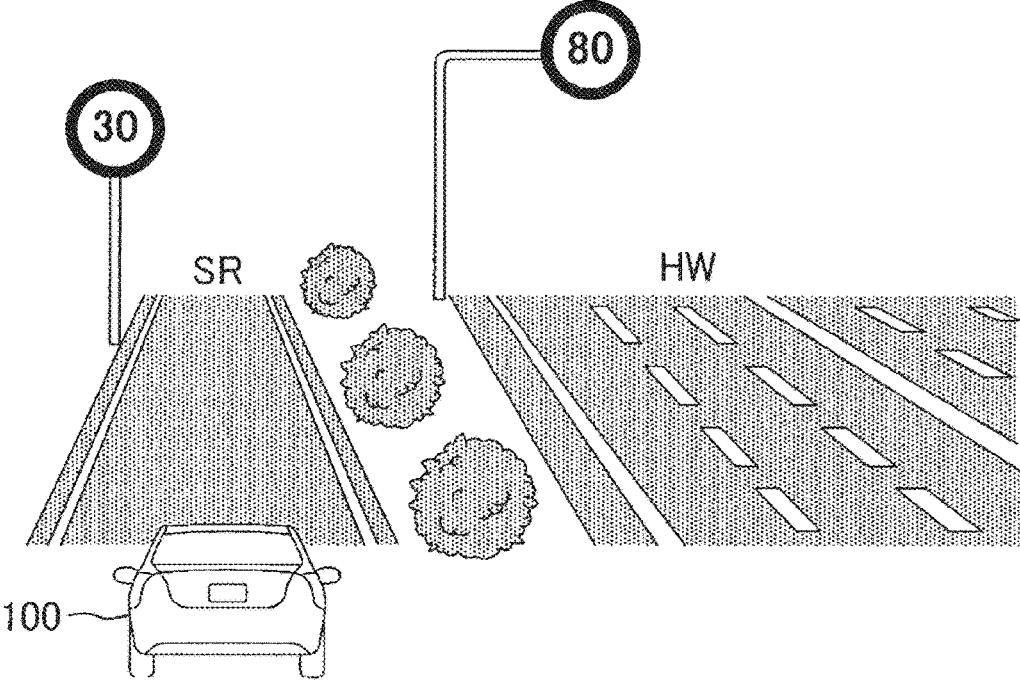
FIG. 4 is a view of the particular scene shown in FIG. 3 from behind the vehicle.

For example, as illustrated in FIGS. 3 and 4, the host vehicle 100 may be traveling on a "side road SR adjoining the expressway HW", and a road sign representing the maximum speed may be provided close to each of the expressway HW and the side road SR. In this instance, the image data include both road signs, so that CPU obtains "30 (Km/h)" and "80 (Km/h)" as the maximum speed candidates (the first candidate). As described above, the number of the first candidates is not limited to one, and may be two or more.

Further, CPU acquires, via the navigation ECU40, the maximum speed candidates (second candidates) set for the road including the own lane from the map data of the map database 42 and the present position of the own vehicle estimated based on GPS signal. Then, CPU adopts the first candidate as a candidate of the final maximum speed when the first candidate exists, and adopts the second candidate as a candidate of the final maximum speed when the first candidate does not exist. If neither the first candidate nor the second candidate exists, CPU immediately terminates the routine. Here, CPU continues to display the maximum speed currently displayed on the area 61a of the display unit 61. Further, CPU may not acquire the second candidate, and when the first candidate does not exist, CPU continues to display the maximum speed currently displayed in the area 61a of the display unit 61.

Next, CPU proceeds to S210 to acquire information (road structure information) indicating the structure of the road including the own lane based on the image data acquired by the front camera 21. The road structure information includes the following information.

Radius of the curve (the radius of the line (center line) passing through the center of the left and right dividing lines that define the own lane)

Lane width (distance in the vehicle lateral direction of the left division line and the right division line that define the own lane)

Number of lanes (the number of lanes in the same direction as the direction of travel of the own lane (including the own lane))

Road shoulder width (for example, in a country where the vehicle has laws and regulations for traveling on the left lane, the length of the left division line of the leftmost lane of the road on which the vehicle is passing and the left end of the road)

These pieces of information are acquired from the image data according to a well-known method. The demarcation lines are generally white or yellow lines.

Further, CPU may acquire a value (distance-view correlation value) correlated with the inclination and distance-view of the own lane based on the image data. gradient can be acquired based on how much the "position in the vertical direction of the image generated by the image data" of the infinity point obtained from the image data deviates from the "position in the vertical direction of the image generated by the image data" of the infinity point when the host vehicle is traveling on the horizontal road surface. The distance visual correlation value can be acquired, for example, as a value based on the distance between the farthest position that can be recognized by the left division line of the own lane and the own vehicle. Note that the distance view is, for example, 1. on the center line of the own lane. The distance measured along the center line is a distance at which the apex of the object in the height 10 (cm) located on the center line from the height of 2 (m) can be seen.

Next, CPU proceeds to S215 and estimates the "maximum value VLmaxA and minimum value VLminA" of the maximum speed (speed limit) based on the road structure information acquired by S210. That is, CPU estimates a range (maximum speed range) that the maximum speed set for the road including the own lane can take on the basis of the road structure information. More specifically, the non-volatile memory of the driving support ECU10 stores a look-up table created by referring to the laws and regulations of the country in which the host vehicle is scheduled to travel. As illustrated in FIG. 5, the look-up table defines a relation between "curved radius, lane width, number of lanes, road shoulder width" which is road structure information and "maximal value VLmaxA and minimal value VLminA". CPU obtains the "maximum-value VLmaxA and minimum-value VLminA" by applying the "curve radius, lane width, lane number, road shoulder width" obtained in S210 to the look-up table.

Next, CPU proceeds to S220 and determines whether or not the minimum-value VLminA obtained by S215 is equal to or greater than the threshold value Vth. In this threshold value Vth, when the minimum value VLminA is equal to or larger than the threshold value Vth, is set such that the road including the own lane becomes a road on which a variable display road sign (for example, a road sign including an electric bulletin board) that is a road sign capable of changing the display of the maximum speed may be installed. An example of such a road is an automobile-only road (in particular, an expressway).

When the minimum value VLminA is less than the threshold value Vth, CPU proceeds from S220 to S225, and proceeds to S245 by setting the final maximum value VLmax to the maximum value VLmaxA and setting the final minimum value VLmin to the minimum value VLminA.

On the other hand, when the minimum-value VLminA obtained by S215 is equal to or larger than the threshold value Vth, CPU sequentially executes the "S230 to S240 processes" described below, and then proceeds to S245.

S230: As described below, CPU acquires weather information of an area around the host vehicle from various information sources. The weather information includes the following information.

Field of view: The field of view is the distance visible to the driver. CPU obtains a view from the image data. For example, CPU acquires, as information representing the field of view, the distance between the farthest position of the left-hand or right-hand dividing line of the own lane that can be recognized based on the image data and the own vehicle.

Presence/absence of road surface freezing: CPU acquires the presence/absence of road surface freezing when the outside air temperature acquired from the outside air temperature sensor 71 is equal to or lower than a predetermined temperature.

Rain/snowfall level: CPU obtains the rainfall per hour or snowfall level as a rainfall/snowfall level based on a number from the wiper switch 72 and/or the raindrop sensor 73. The rainfall/snow level is classified into any of three levels: "strong, normal, weak, or absent". For example, when the wiper switch 72 is in a position to drive the wiper 81 at high speed, the rainfall/snowfall level is determined to be "strong". When the wiper switch 72 is in a position to drive the wiper 81 at a normal speed, the rainfall/snowfall level is determined to be "normal". When the wiper switch 72 is in a position to intermittently drive the wiper 81 and in a position not to drive the wiper, the rainfall/snowfall level is determined to be "weak or no".

Existence of strong wind: CPU uses the communication ECU50 to acquire information about the existence of strong wind from the roadside device by communication.

CPU transmits the present position of the host vehicle estimated based on GPS signal to an external information center via the communication ECU50. The external information center transmits weather information (field of view, presence or absence of road surface freezing, rainfall/snowfall level, presence or absence of strong wind) of the area including the current position of the host vehicle to the host vehicle. CPU may obtain the weather information via a communication ECU50.

S235: CPU estimates the "maximum value VLmaxB and minimum value VLminB" of the regulation speed that regulates the maximum speed (speed limit) based on the weather information acquired by S230. More specifically, the non-volatile memory of the driving support ECU10 stores a look-up table created by referring to the laws/standards of the country in which the host vehicle is scheduled to travel. As illustrated in FIG. 6, the look-up table defines a relation between "visibility, presence/absence of road surface freezing, rainfall/snowfall level, presence/absence of strong wind" and "maximal value VLmaxB and minimal value VLminB" which are weather information. CPU obtains the "maximum-value VLmaxB and minimum-value VLminB" by applying the "visibility, presence/absence of road surface freezing, rainfall/snowfall level, and presence/absence of strong wind" acquired in S230 to the look-up table.

For example, in the case of Japan, a variable display road sign is provided on an expressway, a vehicle-dedicated road, or the like, and the sign changes (regulates) the maximum speed to a smaller value according to the weather. For example, if the weather condition deteriorates when the maximum speed is 80 km/h in a normal state, the maximum speed is changed to a regulating speed set at a speed lower than 80 km/h (for example, 50 km/h, 30 km/h, 0 km/h). The look-up table of FIG. 6 is predetermined in accordance with such laws/standards.

S240: CPU sets the final maximum value VLmax to "the smaller of the maximum value VLmaxA and the maximum value VLmaxB". Further, CPU sets the final minimum value VLmin to "the smaller of the minimum value VLminA and the minimum value VLminB".

In S245, CPU determines whether or not there are any candidates that are equal to or larger than the minimum value VLmin and equal to or smaller than the maximum value VLmax among the maximum speed candidates acquired by S205. That is, CPU determines whether there are any candidates included in the maximum speed range among the maximum speed candidates.

If there is a candidate that is greater than or equal to the minimum value VLmin and less than or equal to the maximum value VLmax in the maximum speed candidate, CPU proceeds from S245 to S250. CPU determines whether only one of the maximum speed candidates is equal to or greater than the minimum value VLmin and equal to or less than the maximum value VLmax. Then, when there is only one maximum speed candidate that is equal to or higher than the minimum value VLmin and equal to or lower than the maximum value VLmax, CPU proceeds from S250 to S255 and displays the maximum speed candidate as the maximum speed in the area 61*a* of the display unit 61. At this time, CPU may generate the maximum speed from the speaker 62. After that, CPU proceeds to S295 and ends the routine once.

For example, as illustrated in FIGS. 3 and 4, CPU may acquire "30 km/h" and "80 km/h" as the maximum speed candidates. In this, when the maximum value VLmax estimated from the road structure information and the weather information is "50 km/h" and the minimum value VLmin is "20 km/h", where the "30 km/h" between the maximum value VLmax and the minimum value VLmin is displayed as the maximum speed in the area 61*a* of the display unit 61.

If there is not only one (a plurality of) maximum speed candidates that are greater than or equal to the minimum value VLmin and less than or equal to the maximum value VLmax, CPU proceeds from S250 to S260. CPU displays the lowest speed among the maximum speed candidates that are equal to or higher than the minimum value VLmin and equal to or lower than the maximum value VLmax as the maximum speed in the area 61*a* of the display unit 61. At this time, CPU causes the display unit 61 to display a message indicating that the actual maximum speed may be higher than the displayed speed. Further, CPU may cause the speaker 62 to pronounce the maximum speed and the messaging. After that, CPU proceeds to S295 and ends the routine once.

If there is a maximum speed candidate but there is no maximum speed candidate that is greater than or equal to the minimum value VLmin and less than or equal to the maximum value VLmax, CPU proceeds S265 from S245 and ceases displaying the maximum speed. That is, in this case, the maximum speed is not displayed on the display unit 61. Further, CPU does not produce a maximum speed from the speaker 62. After that, CPU proceeds to S295 and ends the routine once. If CPU determines "No" in S250, it may proceed to S265 and S295. That is, when CPU determines "No" in S250, it is not necessary to display the maximum speed on the display unit 61. Further, when CPU proceeds to S265, the display of the maximum speed currently displayed on the display unit 61 may be continued.

As described above, according to the embodiment of the present disclosure, the road structure information is acquired based on the image data, and the range of the maximum speed is estimated based on the road structure information. When the numerical value included in the captured scene is within the range of the maximum speed, the numerical value is displayed as the maximum speed. Therefore, it is possible to reduce the possibility that an erroneous maximum speed is displayed.

Further, even when the subject vehicle is traveling on a road where the variable display road sign is provided and the maximum speed is changed according to the weather condition by the sign, the range of the maximum speed is corrected by the "acquired weather information of the area around the subject vehicle". Therefore, the accuracy of the range of the maximum speed may be further improved, and thus the possibility that an erroneous maximum speed is displayed may be reduced.

The present disclosure is not limited to the above-described embodiments and modifications, and various modifications can be adopted within the scope of the present disclosure. For example, in the above-described embodiment, the road structure information may include one or more of "radius of curvature, lane width, number of lanes identical to the traveling direction, road shoulder width, gradient, and distance visual correlation value", and may include other parameters indicating the road structure. Similarly, the weather information may include one or more of "visibility, presence or absence of road surface freezing, rainfall/snowfall level, presence or absence of strong wind", and may include other parameters indicating a weather condition that may affect the maximum speed. In addition, the present disclosure can also be applied to an autonomous vehicle.

Further, CPU may estimate the "maximum value VLmaxA and minimum value VLminA" (range of maximum speed) using AI (artificial intelligence) in S215. Here, AI machine-learns the relation between the road structure information and the "maximum-value VLmaxA and minimum-value VLminA". Similarly, CPU may use AI to estimate the "maximum value VLmaxB and minimum value VLminB" in S235. Here, AI learns the relation between the weather data and the "maximum value VLmaxB and minimum value VLminB".

Further, CPU may determine, in S220, whether the host vehicle is traveling on a "road on which a variable indication road sign can be provided" based on the road structure information acquired by S210. For example, when the lane width is within the predetermined range and the number of lanes is two or more, CPU determines that the host vehicle is traveling on a "road on which a variable indication road sign can be provided". Then, CPU proceeds from S220 to S230 when it is determined that the host vehicle is traveling on a "road on which a variable indication road sign can be provided". CPU proceeds from S220 to S225 when it is determined that the host vehicle is not traveling on a "road on which a variable indication road sign may be provided". In addition, in S255 and S260, CPU may notify the driver of the maximum speed only by displaying the maximum speed on the display unit 61 without causing the speaker 62 to emit the maximum speed.

What is claimed is:

1. A maximum speed informing device comprising:
a camera device that acquires image data by capturing a scene ahead of a vehicle;
an informing unit configured to be able to provide information to a driver of the vehicle; and a controller configured to be able to change the information provided from the informing unit, wherein the controller is configured to:
acquire numerical values included in the captured scene as maximum speed candidates based on the image data;
acquire road structure information that indicates a structure of a road on which the vehicle is traveling based on the image data;
estimate a maximum speed range as a possible range of a maximum speed set for the road based on the acquired road structure information; and
cause the informing unit to indicate a candidate within the estimated maximum speed range, among the maximum speed candidates, as the maximum speed set for the road.

2. The maximum speed informing device according to claim 1, wherein the controller is configured to:
acquire weather information for an area around the vehicle; and
correct the maximum speed range estimated based on the road structure information based on the weather information.

3. The maximum speed informing device according to claim 1, further comprising a position acquisition device that acquires a present position of the vehicle, wherein the controller is configured to acquire maximum speeds acquired based on the acquired present position of the vehicle and map data as the maximum speed candidates.

4. A maximum speed informing method comprising:
acquiring image data by capturing a scene ahead of a vehicle using a camera device;
acquiring numerical values included in the captured scene as maximum speed candidates based on the image data;
acquiring road structure information that indicates a structure of a road on which the vehicle is traveling based on the image data;
estimating a maximum speed range as a possible range of a maximum speed set for the road based on the acquired road structure information; and
causing an informing unit to indicate a candidate within the estimated maximum speed range, among the maximum speed candidates, as the maximum speed set for the road.

5. A non-transitory storage medium storing a program to be executed by a computer mounted on a vehicle, the program causing the computer to execute a process comprising:
acquiring image data by capturing a scene ahead of a vehicle using a camera device;
acquiring numerical values included in the captured scene as maximum speed candidates based on the image data;
acquiring road structure information that indicates a structure of a road on which the vehicle is traveling based on the image data;
estimating a maximum speed range as a possible range of a maximum speed set for the road based on the acquired road structure information; and
causing an informing unit to indicate a candidate within the estimated maximum speed range, among the maximum speed candidates, as the maximum speed set for the road.

* * * * *